United States Patent
Usui et al.

(10) Patent No.: US 9,153,387 B2
(45) Date of Patent: *Oct. 6, 2015

(54) PHOTOELECTRIC CONVERSION ELEMENT

(75) Inventors: Hiroki Usui, Chiba (JP); Hiroshi Matsui, Tokyo (JP); Kenichi Okada, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,658

(22) Filed: Aug. 24, 2011

(65) Prior Publication Data

US 2012/0006406 A1 Jan. 12, 2012

Related U.S. Application Data

(63) Continuation of application No. PCT/JP2010/052742, filed on Feb. 23, 2010.

(30) Foreign Application Priority Data

Feb. 24, 2009 (JP) .................................. 2009-040690

(51) Int. Cl.
*H01L 31/00* (2006.01)
*H01G 9/20* (2006.01)

(52) U.S. Cl.
CPC ........... *H01G 9/2077* (2013.01); *H01G 9/2031* (2013.01); *H01G 9/2059* (2013.01); *Y02E 10/542* (2013.01)

(58) Field of Classification Search
CPC . H01G 9/2004; H01G 9/2027; H01G 9/2031; H01G 9/2059; H01G 9/2077; Y02E 10/542
USPC ................................................. 136/263, 259
See application file for complete search history.

(56) References Cited

U.S. PATENT DOCUMENTS 6,555,741 B1 *  4/2003  Hopkins et al. ................ 136/263
2006/0016473 A1 *  1/2006  Choi et al. ..................... 136/263

(Continued)

FOREIGN PATENT DOCUMENTS

EP            2352200 A1     8/2011
JP        2003-297446 A    10/2003

(Continued)

OTHER PUBLICATIONS

JP 2008-186692 machine translation, Aug. 2008, p. 1-20.*

(Continued)

*Primary Examiner* — Thanh-Truc Trinh
(74) *Attorney, Agent, or Firm* — Sughrue Mion, PLLC (57) ABSTRACT

The photoelectric conversion element of the present invention includes: a pair of electrodes facing one another; a oxide semiconductor layer provided on one of the pair of electrodes; an electrolyte disposed between the electrodes; and a sealing part that connects the electrodes, and surrounds and seals the oxide semiconductor layer and the electrolyte. At least a portion of the sealing part comprises an inorganic sealing part formed of an inorganic material and on a surface of at least one of the electrodes and a resin sealing part that is connected to the inorganic sealing part along the direction connecting the electrodes and comprises a material including a resin. A region on a surface of the inorganic sealing part on a side closer to the electrolyte than a region connected to the resin sealing part is covered with a protective resin layer that is resistant to the electrolyte.

5 Claims, 3 Drawing Sheets (56) References Cited

U.S. PATENT DOCUMENTS

| | | | |
|---|---|---|---|
| 2006/0162770 A1* | 7/2006 | Matsui et al. | ............ 136/263 |
| 2007/0284761 A1 | 12/2007 | Morooka et al. | |
| 2009/0000661 A1 | 1/2009 | Yoshimoto et al. | |

FOREIGN PATENT DOCUMENTS

| | | | | |
|---|---|---|---|---|
| JP | 2005-243440 | * | 9/2005 | ............ H01L 31/04 |
| JP | 2005-243440 A | | 9/2005 | |
| JP | 2005-243557 A | | 9/2005 | |
| JP | 2006-100068 A | | 4/2006 | |
| JP | 2007-149652 A | | 6/2007 | |
| JP | 2007-220606 A | | 8/2007 | |
| JP | 2008-186692 A | | 8/2008 | |
| JP | 2008-226782 A | | 9/2008 | |
| JP | 2008-235104 A | | 10/2008 | |
| WO | 2007/046499 A1 | | 4/2007 | |

OTHER PUBLICATIONS

Supplementary Extended European Search Report dated Jan. 28, 2013, issued in corresponding European Patent Application No. 10746192.3-1235.

European Search Report issued Apr. 23, 2014 in European Patent Application No. 10746192.3.

* cited by examiner

PHOTOELECTRIC CONVERSION ELEMENT

CROSS REFERENCE TO RELATED APPLICATIONS

This application is a Continuation of National Stage of International Application No. PCT/JP2010/52742 filed Feb. 23, 2010, claiming priority based on Japanese Patent Application No. 2009-040690 filed Feb. 24, 2009, the contents of all of which are incorporated herein by reference in their entirety.

TECHNICAL FIELD

The present invention relates to a photoelectric conversion element.

BACKGROUND ART

A dye-sensitized solar cell is developed by Gratzel, et al., (Swiss), has advantages of high photoelectric conversion efficiency and low manufacturing cost, and attracts attention as a new type solar cell.

The dye-sensitized solar cell has a structure in which a working electrode on which a porous oxide semiconductor layer having a photo-sensitized dye supported thereon and a counter electrode that is provided so as to face the working electrode are provided on a transparent base having a transparent semiconductor film provided thereon, in which an electrolyte containing redox pairs is filled between the working electrode and the counter electrode and sealed by a sealing member.

In this type of dye-sensitized solar cell, when the photo-sensitized dye absorbs incident light, such as sun light or the like, electrons are generated and injected into oxide semiconductor fine particles, and electromotive force is generated between the working electrode and the counter electrode. In this way, the dye-sensitized solar cell serves as a photoelectric conversion element that converts light energy into power.

In general, as the electrolyte, an electrolytic solution obtained by dissolving redox pairs, such as $I^-/I^{3-}$, in an organic solvent, such as acetonitrile, is used. In addition, for example, the following structures have been known: a structure using a non-volatile ionic liquid; a structure that gelates a liquid electrolyte with an appropriate gelling agent to pseudo-solidify the liquid electrolyte; and a structure using a solid-state semiconductor, such as a p-type semiconductor.

The counter electrode needs to be made of a material having resistance to corrosion that is caused by a chemical reaction with the electrolyte. As the material, a titanium substrate on which a platinum film is formed or a glass electrode substrate on which a platinum film is formed may be used.

A dye-sensitized solar cell has been suggested in which evaporation of a volatile solvent contained in the electrolytic solution can be prevented by sealing performed by heating and melting Himilan (trade name, produced by Du Pont-Mitsui Polychemicals Co., Ltd.), which is generally an ionomer (see, for example, Patent Document 1).

A dye-sensitized solar cell has also been suggested in which evaporation of a volatile solvent contained in the electrolytic solution can be prevented by sealing performed by heating and melting an ethylene—vinyl alcohol copolymer since such copolymer has gas barrier ability superior to that of Himilan (see, for example, Patent Document 2).

Patent Document 1: Japanese Patent Application Publication No. 2003-297446

Patent Document 2: Japanese Patent Application Publication No. 2007-149652

DISCLOSURE OF THE INVENTION

However, in the dye sensitized solar cells described in Patent Documents 1 and 2, variation in photoelectric conversion efficiency with time cannot be said to be at a sufficiently low level and a dye-sensitized solar cell that excels in durability is required.

Accordingly, it is an object of the present invention to provide a photoelectric conversion element that excels in durability.

The present inventors have conducted a comprehensive study of factors causing variation in photoelectric conversion efficiency with time. As a result, the inventors have presumed that the main cause of such variation in time is that leak of the electrolytic solution from the sealing part, in particular, leak of the organic solvent contained in the electrolytic solution is remarkable. Accordingly, the inventors have replaced the conventional sealing part constituted only by a resin with a sealing part in which an inorganic sealing part constituted by an inorganic material and a resin sealing part constituted by a resin are connected along the direction connecting the pair of electrodes. As a result, the contact surface area of the electrolytic solution and the resin sealing part is decreased and leak of electrolytic solution is reduced due to a high sealing ability of the inorganic sealing part, thereby making it possible to increase the durability of the photoelectric conversion element by comparison with that in the case in which the sealing part is constituted only by a resin sealing part. At this time, the inorganic material has been further coated with a resin with good chemical resistance such as a polyimide in order to improve the durability of the inorganic sealing part.

However, it has been made clear that the protective resin layer having chemical resistance can demonstrate low adhesion to the resin and the resin sealing part and the protective resin portion can peel off from each other.

Accordingly, the inventors continued the research and have discovered that the abovementioned problem can be resolved by the following invention.

Namely, the photoelectric conversion element in accordance with the present invention includes: a pair of electrodes that face one another; a porous oxide semiconductor layer provided on one of the pair of electrodes; an electrolyte disposed between the pair of electrodes; and a sealing part that connects the pair of electrodes, and surrounds and seals the porous oxide semiconductor layer and the electrolyte, wherein at least a portion of the sealing part is constituted by an inorganic sealing part formed of an inorganic material and formed on a surface of at least one of the pair of electrodes and a resin sealing part that is connected to the inorganic sealing part along a direction of connecting the pair of electrodes and formed of a material including a resin; and a region of the inorganic sealing part on a side closer to the electrolyte than a region connected to the resin sealing part on a surface of the inorganic sealing part is covered with a protective resin layer that is resistant to the electrolyte.

With such a photoelectric conversion element, the sealing part seals the porous oxide semiconductor layer and the electrolyte. At least a portion of the sealing part is constituted by an inorganic sealing part constituted by an inorganic material and a resin sealing part including a resin and connected to the inorganic sealing part. The inorganic sealing part has sealing ability higher than that of the resin sealing part to the electrolyte. Therefore, in the photoelectric conversion element in accordance with the present invention, leak of the electrolyte can be inhibited better than in the case in which the sealing part is constituted only by a resin sealing part due to the presence of the inorganic sealing part.

Further, since the inorganic sealing part is constituted by an inorganic material, the inorganic sealing part and the resin sealing part are connected by a strong adhesive force. Therefore, peeling of the inorganic sealing part and the resin sealing part becomes difficult. Further, since a region on a surface of the inorganic sealing part on a side closer to the electrolyte than a region connected to the resin sealing part is covered with the protective resin layer, the inorganic sealing part is prevented from contact with the electrolyte and therefore has higher durability. Thus, the photoelectric conversion element has excellent durability.

The abovementioned photoelectric conversion element preferably further includes: a wiring part having a current collecting wiring constituted by a metal and provided on at least one surface of the pair of electrodes between the pair of electrodes and a wiring protective layer constituted by an inorganic material and covering the current collecting wiring, wherein at least a portion of the wiring part constitutes at least a portion of the inorganic sealing part; and in a portion of the wiring part that constitutes the inorganic sealing part, the resin sealing part is connected to the wiring protective layer, and a region on a surface of the inorganic sealing part on a side closer to the electrolyte than a region connected to the resin sealing part is covered with a protective resin layer that is resistant to the electrolyte.

With such a photoelectric conversion element, at least a portion of the wiring part formed on at least one of the pair of electrodes between the pair of electrodes constitutes at least a portion of the inorganic sealing part. In other words, the wiring part constituting a portion of the inorganic sealing part constitutes a portion of the sealing part. Thus, at least a portion of the wiring part is not provided on the side opposite that of the region surrounded by the sealing part and is not provided on the region side surrounded by the sealing part. As a result, it is possible to reduce the surface area occupied by the wiring part and the sealing part and to minimize the incident light blocked by the wiring part and sealing part. Therefore, the surface area of the porous oxide semiconductor layer can be increased, while keeping down the electric resistance by the function of the current collecting wiring. As a consequence, high photoelectric conversion efficiency can be attained.

In a portion in which the wiring part constitutes the inorganic sealing part, the region on a surface of the wiring protective layer on a side closer to the electrolyte than a region connected to the resin sealing part is covered with the protective resin layer. Therefore, the current collecting wiring is protected for electrolyte-induced corrosion over a long period.

Further it is preferred that in the abovementioned photoelectric conversion element, another portion of the wiring part be provided on at least one surface of the pair of electrodes in a region surrounded by an inner circumference of the sealing part, and the wiring protective layer in the region surrounded by the inner circumference of the sealing part be entirely covered with the protective resin layer.

With such a photoelectric conversion element, the wiring part is provided within the region surrounded by the inner circumference of the sealing part. Therefore, the electric resistance of the photoelectric conversion element can be further reduced. Further, since the wiring protective layer located within the region surrounded by the inner circumference of the sealing part is covered with the protective resin layer, the current collecting wiring is protected from electrolyte-induced corrosion over a long period.

Further it is preferred that in the abovementioned photoelectric conversion element, the wiring part be provided from a region surrounded by an outer circumference of the sealing part to an outside of the outer circumference of the sealing part, a terminal is provided on a surface in at least one of the pair of electrodes on an opposite side to a side between the pair of electrodes, and the terminal is formed at a position overlapping the wiring part in the region surrounded by the outer circumference of the sealing part when the electrode provided with the terminal is viewed along a direction of connecting the pair of electrodes.

With such a photoelectric conversion element, the current collecting wiring of the wiring part provided at at least one of the pair of electrodes is made from a metal and therefore excels in thermal conductivity. Further, the terminal is formed at a position overlapping the wiring part in the region surrounded by the outer circumference of the sealing part when the electrode where the terminal is provided is viewed along the direction in which the pair of electrodes are connected. Therefore, the terminal formation position and the current collecting wiring position are close to each other, and when a conductive wire or the like is soldered to the terminal, the heat conducted to the inner side of the outer circumference of the sealing part via the electrode where the terminal is formed is easily conducted to the current collecting wiring. Further, the heat conducted to the current collecting wiring is dissipated to the outside of the outer circumference of the sealing part due to excellent heat conduction of the current collecting wiring. Thus, the photosensitizing dye supported on the porous oxide semiconductor layer and the electrolyte can be prevented from being degraded by heat conducted via the electrode where the terminal is formed, when soldering to the terminal is performed.

EFFECTS OF THE INVENTION

The present invention provides a photoelectric conversion element of excellent durability.

MODE FOR CARRYING OUT THE INVENTION

The preferred embodiments of the photoelectric conversion element in accordance with the present invention will be described below in greater detail with reference to the drawings.

First Embodiment

Figure 1:
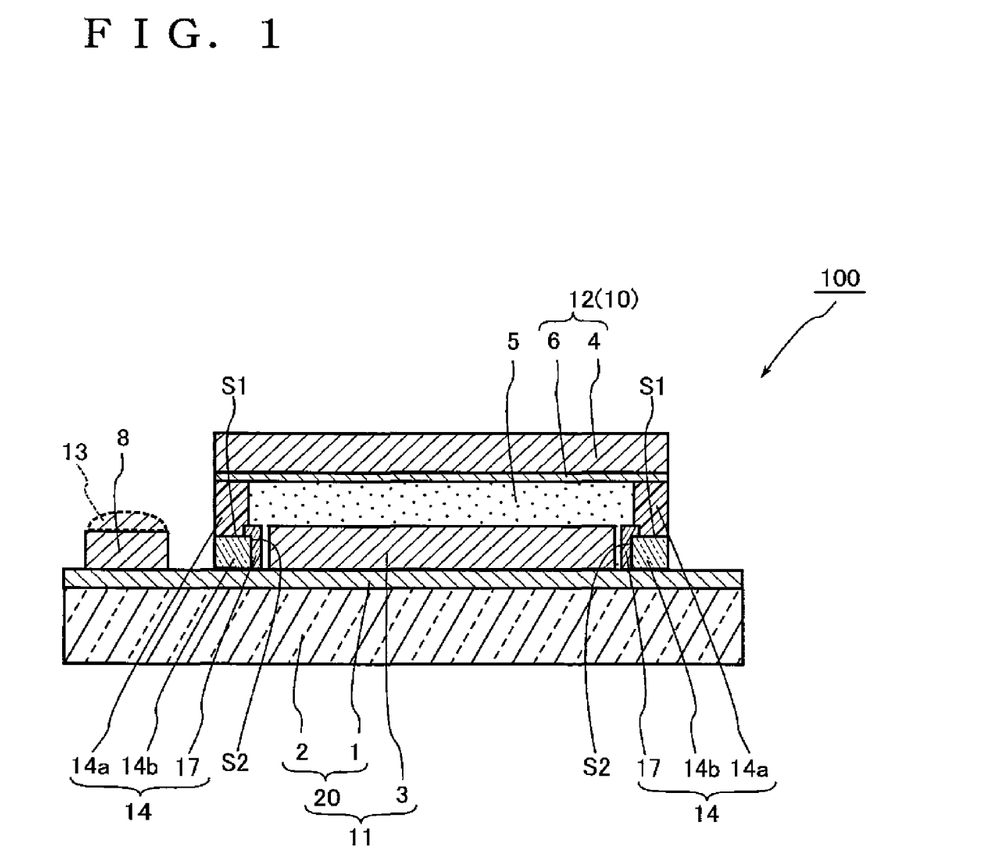
FIG. 1 is a cross-sectional view illustrating a photoelectric conversion element according to the first embodiment of the present invention.

FIG. 1 is a schematic cross-sectional view illustrating the photoelectric conversion element according to the first embodiment of the present invention.

As shown in FIG. 1, a photoelectric conversion element 100 includes as the main constituent elements a working electrode 11, a counter electrode 12 disposed so as to face the working electrode 11, an electrolyte 5 disposed between the working electrode 11 and the counter electrode 12, and a sealing part 14 that surrounds the electrolyte 5.

Working Electrode

The working electrode 11 includes a second electrode 20 constituted by a transparent base material 2 and a transparent conductor 1 provided on one surface of the transparent base material 2 and a porous oxide semiconductor layer 3 provided on the transparent conductor 1 and supporting a photosensitizing dye.

The transparent base material 2 is constituted by a substrate composed of a light-transmitting material. Examples of such materials include glass, polyethylene terephthalate (PET), polycarbonate (PC), polyether sulfones (PES), and polyethylene naphthalate (PEN), and any material that is usually used as a transparent base material for a photoelectric conversion element can be used. The material for the transparent base material 2 is selected as appropriate from the above-mentioned materials with consideration for resistance to the electrolyte, or the like. The transparent base material 2 is preferably as excellent as possible in light transmission ability and a base material with a light transmittance equal to or greater than 90% is more preferred.

The transparent conductor 1 is a transparent conductive film, and this film is formed on the entire surface of the transparent base material 2 or a part of one surface thereof. In order to obtain a structure that causes no significant loss of transparency of the working electrode 11, it is preferred that the transparent conductor 1 be a thin film made from a conductive metal oxide. Examples of such conductive metal oxides include indium tin oxide (ITO), fluorinated tin oxide (FTC), and tin oxide ($SnO_2$). Further, the transparent conductor 1 may have a single-layer structure or be constituted by a laminate of a plurality of layers that is constituted by different conductive metal oxides. When the transparent conductor 1 is constituted by a single layer, ITO and FTO are preferred from the standpoint of facilitating the formation of film and reducing the production cost, and FTO is even more preferred from the standpoint of ensuring high heat resistance and also chemical resistance.

Where the transparent conductor 1 is composed of a laminate constituted by a plurality of layers, it is preferred that properties of each layer could be reflected in the transparent conductor. Among the laminates, a laminated film obtained by laminating a FTO film on an ITO film is preferred. In this case, the transparent conductor 1 having high electric conductivity, heat resistance, and chemical resistance can be realized, and it is possible to configure a transparent conductive substrate with low absorption of light in the visible range and high conductivity. Further, the thickness of the transparent conductor 1 may be for example within a range from 0.01 µm to 2 µm.

The oxide semiconductor forming the porous oxide semiconductor layer 3 is not particularly limited and any oxide semiconductor that is usually used to form a porous oxide semiconductor for a photoelectric conversion element can be used. Examples of such oxide semiconductors include titanium oxide ($TiO_2$), tin oxide ($SnO_2$), tungsten oxide ($WO_3$), zinc oxide (ZnO), niobium oxide ($Nb_2O_5$), strontium titanate ($SrTiO_3$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), and aluminum oxide ($Al_2O_3$). An oxide semiconductor constituted by two or more of the above-mentioned oxides may be also used.

The average particle size of these oxide semiconductors is preferably 1 to 1000 nm because the surface area of the oxide semiconductor covered with the dye can be increased, that is, the field of photoelectric conversion can be expanded and a larger number of electrons can be generated. Further, the porous oxide semiconductor layer 3 is preferably configured by stacking layers of oxide semiconductor particles of different particle size distribution. In this case, multiple light reflection inside the semiconductor layers can be induced, the quantity of incident light escaping to the outside of the porous oxide semiconductor layer 3 can be reduced, and the light can be converted into electrons with better efficiency. The thickness of the porous oxide semiconductor layer 3 may be for example, 0.5 to 50 µm. The porous oxide semiconductor layer 3 can be also constituted by a laminate of a plurality of oxide semiconductors constituted by different materials.

Examples of suitable photosensitizing dyes include ruthenium complexes including a bipyridine structure, a terpyridine structure, or the like in a ligand, metal complexes such as complexes of porphyrin and phthalocyanine, and organic dyes such as eosin, rhodamine, and merocyanine. Among them, those demonstrating the behavior suitable for the particular application and semiconductor used can be selected without particular limitations. More specifically, N3, N719, and N749 (black dye) can be used.

Electrolyte

An electrolyte prepared by impregnating the porous oxide semiconductor 3 with an electrolytic solution, an electrolyte prepared by impregnating the porous oxide semiconductor 3 with an electrolytic solution, then gelling (pseudo-solidifying) the electrolytic solution by using an appropriate gelling agent and integrating the electrolytic solution with the porous oxide semiconductor 3, or a gel-like electrolyte including an ionic liquid, oxide semiconductor particles, or electrically conductive particles can be used as the electrolyte 5.

A solution prepared by dissolving an electrolyte component such as iodine, iodide ion, and tertiary butyl pyridine in an organic solvent such as ethylene carbonate or methoxyacetonitrile can be used as the abovementioned electrolytic solution. Examples of gelling agents suitable for use when gelling the electrolytic solution include polyvinylidene fluoride, polyethylene oxide derivatives, and amino acid derivatives.

The above-mentioned ionic liquid is not particularly limited and it can be an ambient temperature molten salt which is a liquid at a room temperature and includes a compound having quaternized nitrogen atom as a cation or an anion. Examples of cations of the ambient temperature molten salt include quaternary imidazolium derivatives, quaternary pyridinium derivatives, and quaternary ammonium derivatives. Examples of anions of the ambient temperature molten salt include $BF_4^-$, $PF_6^-$, $F(HF)_n^-$, bistrifluoromethyl sufonylimide [$(CF_3SO_2)_2N^-$], and an iodide ion. Specific examples of ionic liquids include salts constituted by a quaternary imidazolium-based cation and an iodide ion or a bistrifluoromethyl sufonylimide ion.

The type of substance or particle size of the oxide semiconductor particles are not particularly limited, and particles that excel in miscibility with the electrolytic solution including the ionic liquid as the main component and cause gelling of the electrolytic solution can be used. Further, the oxide semiconductor particles should excel in chemical stability with respect to other coexisting components contained in the electrolyte, without decreasing the electric conductivity of the electrolyte. In particular, it is preferred that the oxide semiconductor particles cause no degradation induced by oxidation reaction even when the electrolyte includes a redox pair such as iodine/iodide ion or bromine/bromide ion.

One or a mixture of two or more oxides selected from the group consisting of $SiO_2$, $TiO_2$, $SnO_2$, $WO_3$, ZnO, $Nb_2O_5$, $In_2O_3$, $ZrO_2$, $Ta_2O_5$, $La_2O_3$, $SrTiO_3$, $Y_2O_3$, $Ho_2O_3$, $Bi_2O_3$, $CeO_2$, and $Al_2O_3$ is preferably used as the oxide semiconductor particles, and titanium dioxide microparticles (nanoparticles) are particularly preferred. The average particle size of the titanium dioxide is preferably about 2 nm to 1000 nm.

Particles having conductivity, such as conductors and semiconductors, can be used as the abovementioned conductive particles. The range of specific resistance of the conductive particles is preferably equal to or less than $1.0 \times 10^{-2}$ $\Omega \cdot cm$, more preferably equal to or less than $1.0 \times 10^{-3}$ $\Omega \cdot cm$. The type and size of the conductive particles are not particularly limited, and particles that excel in miscibility with the electrolytic solution including the ionic liquid as the main component and cause gelling of the electrolytic solution can be used. Further, the conductive particles should excel in chemical stability with respect to other co-present components contained in the electrolyte, without easily decreasing the electric conductivity in the electrolyte. In particular, it is preferred that the conductive particles cause no degradation induced by oxidation reaction even when the electrolyte includes a redox pair such as iodine/iodide ion or bromine/bromide ion.

Examples of such conductive particles include particles constituted by substances having carbon as the main component, specific examples thereof including particles such as carbon nanotubes, carbon fibers, and carbon black. Methods for manufacturing such substances are well known and commercially available products can also be used.

Counter Electrode

The counter electrode 12 is constituted by the first electrode 10. The first electrode is constituted by a metal plate 4 made from titanium or titanium alloy and a catalyst layer 6. The catalyst layer 6 promoting the reduction reaction is formed on the surface of the metal plate 4 on the working electrode 11 side. The catalyst layer 6 is constituted by platinum or carbon.

Sealing Part

The sealing part 14 is constituted by the resin sealing part 14a, inorganic sealing part 14b, and protective resin layer 17. The inorganic sealing part 14b is provided on the working electrode 11 so as to surround the porous oxide semiconductor layer 3, and the resin sealing part 14a is connected to the inorganic sealing part 14b and the counter electrode 12. Thus, the sealing part 14 is connected to the working electrode 11 and the counter electrode 12, and the electrolyte 5 located between the working electrode 11 and the counter electrode 12 is surrounded and sealed by the sealing part 14.

More specifically, the resin sealing part 14a is connected to the inorganic sealing part 14b on a region S1 of the surface of the inorganic sealing part 14b on the side opposite that facing the transparent conductor 1. Further, a region S2 of the surface of the inorganic sealing part 14b that is closer to the electrolyte than the region where the resin sealing part 14a is formed is covered with the protective resin layer 17.

Further, the resin sealing part 14a is also provided on the surface of the protective resin layer 17 adjacent to the region S1. By so providing the resin sealing part 14a from the region S1 of the inorganic sealing part 14b to the surface of the protective resin layer 17 adjacent to the region S1, it is possible to prevent the inorganic sealing part 14b from contact with the electrolyte 5 and maintain high durability of the inorganic sealing part 14b.

Examples of materials constituting the resin sealing part 14a include ionomers, ethylene—vinyl acetate anhydride copolymer, ethylene—methacrylic acid copolymer, and ethylene—vinyl alcohol copolymer, UV-curable resins, and vinyl alcohol polymer. The resin sealing part 14a may be constituted only by a resin or by a resin and an inorganic filler.

Examples of materials constituting the inorganic sealing part 14b include inorganic materials such as lead-free transparent low-melting glass frit, oxides such as titanium oxide ($TiO_2$) and alumina ($Al_2O_3$), carbides such as titanium carbide (TiC) and silicon carbide (SiC), and nitrides such as aluminum nitride (AlN).

Examples of materials constituting the protective resin layer 17 include chemically resistant resins such as polyimides, fluororesins, ionomers, ethylene—vinyl acetate anhydride copolymer, ethylene—methacrylic acid copolymer, ethylene—vinyl alcohol copolymer, UV-curable resins, and vinyl alcohol polymer.

A terminal 8 is formed in an outside region surrounded by the outer circumference of the sealing part 14 on the surface of the working electrode 11 that faces the counter electrode 12. Examples of materials constituting the terminal 8 include metals such as gold, silver, copper, platinum, and aluminum. A solder 13 for connecting the terminal 8 to a conductive wire or the like may be formed on the terminal 8. The solder 13 is not particularly limited, but a low-melting solder is preferred. It is preferred to use a solder with a melting point of less than 200° C. as the low-melting solder, for example. Examples of such solders include eutectic solders (for example, Sn—Pb) and lead-free solders (for example, Sn—Ag, Sn—Cu, Sn—Ag—Cu, Sn—Zn, and Sn—Zn—B).

In the photoelectric conversion element 100 according to the present embodiment, the sealing part 14 seals the porous oxide semiconductor 3 and the electrolyte 5. At least a portion of the sealing part 14 is constituted by the inorganic sealing part 14b constituted by an inorganic material and the resin sealing part 14a including a resin and connected to the inorganic sealing part 14b. The sealing ability of the inorganic sealing part 14b to the electrolyte 5 is higher than that of the resin sealing part 14a. Therefore, in the photoelectric conversion element 100 in accordance with the present invention, due to the presence of the inorganic sealing part 14b, leak of the electrolyte 5 can be suppressed better than in the case in which the sealing part 14 is constituted only by the resin sealing part 14a.

Further, since the inorganic sealing part 14b is constituted by an inorganic material, the inorganic sealing part 14b and the resin sealing part 14a are connected by a strong adhesive force. Therefore, the inorganic sealing part 14b and the resin sealing part 14a are not peeled off from one another easily. Further, since the region S2 of the surface of the inorganic sealing part 14b that is closer to the electrolyte 5 than the region S1 connected to the resin sealing part 14a is covered with the protective resin layer 17, the inorganic sealing part 14b is more durable because contact with the electrolyte is prevented. Thus, the photoelectric conversion element 100 excels in durability.

Next, a method for manufacturing the photoelectric conversion element 100 shown in FIG. 1 will be described.

First, the working electrode 11 and the counter electrode 12 are prepared (preparation process).

The working electrode 11 can be obtained by the following process. Initially, the transparent conductor 1 is formed on one surface of the transparent base material 2 to obtain the second electrode 20. Then, the porous oxide semiconductor layer 3 is formed on the transparent conductor 1 in the second electrode 20. The inorganic sealing part 14b is then formed. A photosensitizing dye is thereafter supported on the porous oxide semiconductor layer 3.

The transparent conductor 1 can be formed on the transparent base material 2, for example, by a thin-film formation method such as a sputtering method, a CVD (chemical vapor deposition) method, a spray pyrolysis deposition method (SPD method), and a vapor deposition method. Among them, the spray pyrolysis deposition method is preferred. By forming the transparent conductor 1 by the spray pyrolysis deposition method, it is possible to control easily the haze ratio. Further, the spray pyrolysis deposition method is preferred because no vacuum system is required and therefore it is possible to simplify production process and reduce costs.

A method for forming the porous oxide semiconductor layer 3 on the transparent conductor 1 mainly includes a coating process and a drying and calcining process. The coating process includes coating, for example, a paste of $TiO_2$ colloid obtained by mixing a $TiO_2$ powder, a surfactant, and a thickening agent at predetermined ratio onto the surface of the transparent conductor 1 which is processed to have hydrophilicity. At that time, as a coating method, for example, the following method is used: a method of moving a pressurizing unit (for example, a glass rod) on the transparent conductor 1 such that the coated colloid has a uniform thickness while pressing the colloid against the transparent conductor 1. The drying and calcining process can include, for example, a method in which the coated colloid is left in an ambient atmosphere at a room temperature for about 30 minutes so as to be dried, and is then calcined at a temperature of 450° C. for about 60 minutes using an electric furnace. The porous oxide semiconductor layer 3 is thus formed on the transparent conductor 1.

The inorganic sealing part 14b can be obtained, for example, by coating a paste prepared by compounding, as necessary, a thickening agent, a binder, a dispersant, a solvent, and the like with an inorganic insulating material such as the above-described low-melting glass frit by a screen printing method or the like, heating and calcining.

The protective resin layer 17 is then formed. The protective resin layer 17 can be obtained by coating a paste prepared by compounding, as necessary, a thickening agent, a binder, a dispersant, a solvent, and the like on a chemically resistant resin or a precursor thereof by a screen printing method so as to cover the side on the surface of the inorganic sealing part 14b (region on the porous oxide semiconductor layer 3 side) that is closer to the region where the electrolyte is expected to be filled than the region S1 which is expected to be in contact with the resin sealing part 14a and then performing heating. Alternatively, the protective resin layer 17 can be obtained by coating a molten chemically resistance resin so as to cover the side on the surface of the inorganic sealing part 14b that is closer to the region where the electrolyte is expected to be filled than the region S1 which is expected to be in contact with the resin sealing part 14a and then cooling the coating naturally at a room temperature. Alternatively, a film-shaped chemically resistance resin is brought into contact with the side on the surface of the inorganic sealing part 14b that is closer to the region where the electrolyte is expected to be filled than the region S1 which is expected to be in contact with the resin sealing part 14a, then heating and melting the film-shaped chemically resistance resin with an external heat source, and then allowing the coating to cool naturally to room temperature. For example, an ionomer or ethylene—methacrylic acid copolymer can be used as the thermoplastic chemically resistance resin. When the chemically resistance resin is a UV-curable resin, the chemically resistance resin can be obtained by coating a UV-curable resin that is a precursor of the chemically resistance resin on the inorganic sealing part 14b and then curing the abovementioned UV-curable resin by UV radiation. When the chemically resistance resin is a water-soluble resin, the chemically resistance resin can be obtained by coating an aqueous solution including the chemically resistance resin on the inorganic sealing part 14b.

In a method of supporting the photosensitizing dye on the porous oxide semiconductor layer 3, first, a dye solution for supporting dye, for example, a solution obtained by adding a very small amount of N3 dye powder to a solvent including acetonitrile and t-butanol at a volume ratio of 1:1 is prepared in advance.

Then, the second electrode 20 having the porous oxide semiconductor layer 3 formed thereon, which is subjected to a heat treatment at a temperature of about 120° C. to 150° C. in a separate electric furnace, is dipped in a solution including the photosensitizing dye as a solute in a schale-shaped container. Then, the second electrode 20 is maintained in a dark place for one day (about 20 hours). Then, the second electrode 20 having the porous oxide semiconductor layer 3 formed thereon is taken out from the solution including the photosensitizing dye, and is cleaned with a mixed solution of acetonitrile and t-butanol. In this way, the working electrode 11 having the porous oxide semiconductor layer 3, which is a $TiO_2$ thin film having the photo-sensitized dye supported thereon, is obtained.

The terminal 8 formed on the working electrode 11 is formed, for example, by coating a silver paste by printing or the like and then heating and calcining. The formation of the terminal 8 is preferably performed before the dye support process.

On the other hand, in order to form the counter electrode 12, first, the metal plate 4 constituted by titanium or a titanium alloy is prepared. The catalyst layer 6 constituted by platinum or the like is then formed on the surface of the prepared metal plate 4. The catalyst layer 6 is formed by a sputtering method or the like. As a result, the first electrode 10 having the metal plate 4 and the catalyst layer 6 can be obtained, and the first electrode 10 serves, as is, as the counter electrode 12.

The electrolyte 5 is then surrounded and sealed by the resin sealing part 14a between the working electrode 11 and the counter electrode 12 (sealing process).

First, a resin, or a precursor thereof, for obtaining the resin sealing part 14a is formed on the working electrode 11 and the inorganic sealing part 14b that has been formed in advance. At this time, the resin or the precursor thereof is formed so as to surround the porous oxide semiconductor layer 3 of the working electrode 11. The resin, or the precursor thereof, formed on the inorganic sealing part 14b is provided on the region S1 of the inorganic sealing part 14b where the protective resin layer 17 is not formed. At this time, the resin, or a precursor thereof, formed on the wiring portion 30s is preferably formed so as to cover part of the protective resin layer 17 in order to cover the region S1 reliably with the resin sealing part 14a.

When the resin is a thermoplastic resin, the resin can be obtained by coating a molten resin on the working electrode 11 and the inorganic sealing part 14b and then cooling it naturally at room temperature, or by bringing the film-shaped resin into contact with the working electrode 11 and the inorganic sealing part 14b and heating and melting the resin by an external heat source, and then cooling it naturally at room temperature. Examples of the thermoplastic resins include ionomers and ethylene—methacrylic acid copolymer. When the resin is a resin cured with UV radiation, a UV-curable resin that is the precursor of the resin is coated on the working electrode 11 and the inorganic sealing part 14b. When the resin is a water-soluble resin, an aqueous solution including the resin is coated on the working electrode 11 and the inorganic sealing part 14b. For example, a vinyl alcohol polymer can be used as the water-soluble resin.

A resin, or a precursor thereof, for forming the resin sealing part 14a is then formed on the counter electrode 12. The resin, or the precursor thereof, on the counter electrode 12 is formed at a position that overlaps the resin, or the precursor thereof, on the working electrode 11 when the working electrode 11 and the counter electrode 12 are disposed to face each other. The formation of the resin, or the precursor thereof, on the counter electrode 12 is preferably performed similarly to the formation of the resin, or the precursor thereof, formed on the working electrode 11.

The electrolyte is then filled in the region surrounded by the resin, or the precursor thereof, on the working electrode 11.

The working electrode 11 and the counter electrode 12 are then disposed to face each other, and the resin on the counter electrode 12 and the working electrode 11 are superimposed on each other. When the resin is a thermoplastic resin, the resin is thereafter heated and melted under a depressurized atmosphere and the working electrode 11 and the counter electrode 12 are bonded to one another. The resin sealing part 14a is thus obtained. When the resin is a resin cured with UV radiation, the UV-curable resin of the resin on the counter electrode 12 and the working electrode 11 are superimposed, the UV-curable resin is thereafter cured with UV radiation, and the resin sealing part 14a is obtained. When the resin is a water-soluble resin, a laminate is formed, then drying is conducted to obtain a dry-to-touch state, and then drying is performed under a low-humidity environment to obtain the resin sealing part 14a. The resin sealing part 14a thus obtained is connected to the inorganic sealing part 14b and serves as the sealing part 14.

When the solder 13 is disposed on the terminal 8, the solder is formed by melting it on the terminal 8 and then solidifying.

The photoelectric conversion element 100 shown in FIG. 1 is thus obtained.

Second Embodiment

Figure 2:
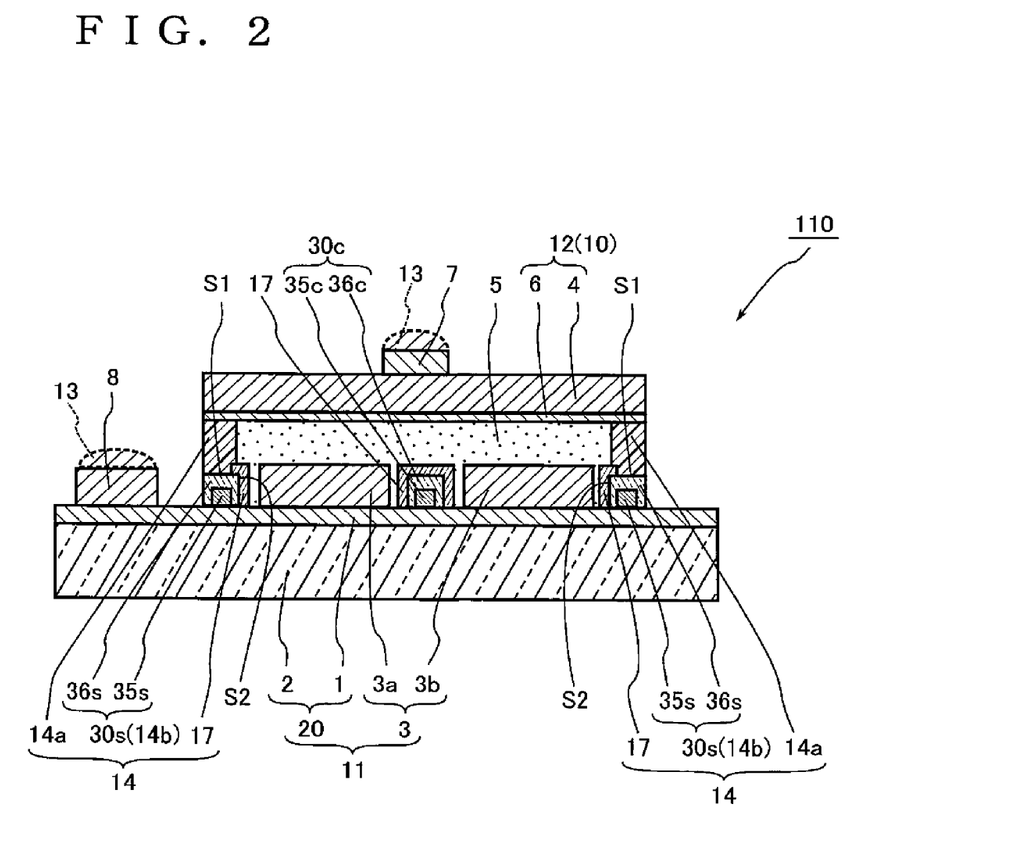
FIG. 2 is a cross-sectional view illustrating a photoelectric conversion element according to the second embodiment of the present invention.

Next, the second embodiment of the photoelectric conversion element in accordance with the present invention will be explained using FIG. 2. In FIG. 2, constituent elements identical or similar to those of the first embodiment are denoted by identical reference numerals and redundant explanation thereof is omitted.

FIG. 2 is a schematic cross-sectional view illustrating the photoelectric conversion element according to the present embodiment.

As shown in FIG. 2, a photoelectric conversion element 110 is different from the photoelectric conversion element 100 according to the first embodiment mainly in that wiring parts 30c, 30s are formed on the working electrode 11 and the terminal 7 is formed on the counter electrode 12.

In the present embodiment, the porous oxide semiconductor layer 3 is constituted by two porous oxide semiconductor layers 3a, 3b.

The wiring part has the wiring part 30c provided on the transparent conductor 1 between the porous oxide semiconductor layers 3a, 3b in the region surrounded by the inner circumference of the sealing part 14 and the wiring part 30s provided on the transparent conductor 1 at a position overlapping the resin sealing part 14a in the direction in which the working electrode 11 and the counter electrode 12 are connected. Further, both wiring parts 30c, 30s extend to the outside of the outer circumference of the sealing part 14 and are connected to the terminal 8.

In the wiring part 30c, a current collecting wiring 35c is entirely covered with a wiring protective layer 36c, and the wiring protective layer 36c is entirely covered with the protective resin layer 17. Contact between the electrolyte 5 and the current collecting wiring 35c is thus prevented. As long as the entire current collecting wiring 35c is covered, the wiring protective layer 36c and the protective resin layer 17 may or may not be in contact with the transparent conductor 1 of the working electrode 11.

The wiring part 30s constitutes at least a portion of the inorganic sealing part 14b. In the wiring part 30s, the current collecting wiring 35s is entirely covered with the wiring protective layer 36s. Further, the resin sealing part 14a is connected to the region S1 of the surface of the wiring protective layer 36s on the side opposite that facing the transparent conductor 1. The region S2 on the surface of the wiring protective layer 36s that is closer to the electrolyte than the region S1 to which the resin sealing part 14a is connected is covered with the protective resin layer 17.

The material constituting the current collecting wirings 35c, 35s may be a metal having an electric resistance lower than that of the transparent conductor 1. Examples of such materials include metals such as gold, silver, copper, platinum, aluminum, titanium, and nickel.

Examples of the material constituting the wiring protective layers 36c, 36s include for example, an inorganic insulating material such as lead-free transparent low-melting glass frit.

The terminal 7 is formed on the surface of the counter electrode 12 on the side opposite that facing the working electrode 11 and at a position overlapping the current collecting wiring 35c in the region surrounded by the outer circumference of the sealing part 14, when the counter electrode 12 is viewed along the direction in which the working electrode 11 and the counter electrode 12 are connected. The terminal 7 is constituted by a metal member including a high-melting solder or at least one of copper and nickel.

A solder with a melting point equal to or higher than 200° C. (for example, equal to or higher than 210° C.) is preferred as the high-melting solder. Examples of such high-melting solders include a Sn—Cu system, a Sn—Ag system, a Sn—Ag—Cu system, a Sn—Au system, a Sn—Sb system, a Sn—Pb system (the content of Pb for example exceeds 85 mass %), and these systems may be used individually or in combinations of two or more thereof.

Examples of the material constituting the metal member include an alloy containing other metal in copper and nickel in addition to a single element, such as copper or nickel.

The solder 13 for connecting the terminal 7 to a conductive wire or the like may be formed on the terminal 7. The solder on the terminal 7 is similar to the solder 13 on the terminal 8.

With the photoelectric conversion element 110 according to the present embodiment, the wiring part 30s formed on the working electrode 11 constitutes at least a portion of the inorganic sealing part 14b. In other words, the wiring part 30s constitutes a portion of the sealing part 14. Thus, the wiring part 30s is not provided on the side opposite that of the region surrounded by the sealing part 14 and is not provided on the region side surrounded by the sealing part 14. As a result, it is possible to reduce the surface area occupied by the wiring part 30s and the sealing part 14 and to minimize the incident light blocked by the wiring part 30s and the sealing part 14. Therefore, the surface area of the porous oxide semiconductor layer 3 can be increased, while keeping down the electric resistance by the operation of the current collecting wiring 35s. As a consequence, high photoelectric conversion efficiency can be attained.

Further, the region S2 of the surface of the wiring protective layer 36s that is closer to the electrolyte than the region S1 that is connected to the resin sealing part 14a is covered with the protective resin layer 17. Therefore, the current collecting wiring 35s is protected from electrolyte-induced corrosion over a long period.

With the photoelectric conversion element 110, the wiring part 30c is provided within the region surrounded by the inner circumference of the sealing part 14. Therefore, the electric resistance of the photoelectric conversion element can be further reduced. Further, since the wiring protective layer 36c located within the region surrounded by the inner circumference of the sealing part 14 is covered with the protective resin layer 17, the current collecting wiring 35c is protected from electrolyte-induced corrosion over a long period.

Further, with the photoelectric conversion element 110, the current collecting wiring 35s of the wiring part 30s provided on the working electrode 11 is made from a metal and therefore excels in thermal conductivity. Further, the terminal 7 is formed at a position overlapping the wiring part 30s, when counter electrode 12 is viewed along the direction in which the counter electrode 12 and the working electrode 11 are connected. Therefore, the formation position of the terminal 7 and the position of current collecting wiring 35s are close to each other, and when a conductive wire or the like is connected to the terminal 7 by using a means involving heating, such as soldering, the heat conducted to the inner side of the outer circumference of the sealing part 14 via the counter electrode 12 where the terminal 7 is formed is easily conducted to the current collecting wiring 35s. Further, the heat conducted to the current collecting wiring 35s is dissipated to the outside of the outer circumference of the sealing part 14 due to excellent heat conduction of the current collecting wiring 35s. Thus, it is possible to prevent the photosensitizing dye supported on the porous oxide semiconductor layer 3 and the electrolyte 5 from being degraded by the heat conducted via the counter electrode when the conductive wiring or the like is connected to the terminal 7 by using a means involving heating, such as soldering.

Next. a method for manufacturing the photoelectric conversion element 110 will be described below.

First, the working electrode 11 and the counter electrode 12 are prepared (preparation process).

The working electrode 11 is prepared in the same manner as in the first embodiment. Namely, initially, the transparent conductor 1 is formed on the transparent base material 2. Then, the porous oxide semiconductor layers 3a, 3b are formed on the transparent conductor 1. In order to form the porous oxide semiconductor layers 3a, 3b, the porous semiconductor may be provided in two locations by using a method similar to the method for forming the porous oxide semiconductor layer 3 in the first embodiment.

The wiring parts 30c, 30s are then formed. More specifically, the wiring part 30c is formed between the porous oxide semiconductor layers 3a, 3b, and the wiring part 30s is formed in the location where the sealing part 14 is expected to be formed on the circumference of the porous oxide semiconductor layer 3.

The current collecting wirings 35c, 35s can be obtained by forming the porous oxide semiconductor layers 3a, 3b, then coating a paste obtained by compounding, as necessary, a thickening agent, a binder, a dispersant, a solvent, and the like with the metal material constituting the current collecting wirings 35c, 35s by a screen printing method or the like on the locations where the current collecting wirings 35c, 35s are to be formed, heating, and calcining. It is preferred that the terminal 8 be formed simultaneously with the current collecting wirings 35c, 35s.

The wiring protective layers 36c, 36s can be obtained by coating a paste obtained by compounding, as necessary, a thickening agent, a binder, a dispersant, a solvent, and the like with an inorganic insulating material such as the above-described low-melting glass frit by a screen printing method or the like so as to cover completely the current collecting wirings 35c, 35s, heating and calcining.

The protective resin layer 17 is then formed on the wiring protective layer 36c and on the wiring protective layer 36s. The protective resin layer 17 located on the wiring protective layer 36c may be formed over the entire surface of the wiring protective layer 36c by the method similar to that used for forming the protective resin layer 17 in the first embodiment. The protective resin layer 17 located on the wiring protective layer 36s may be formed in the side on the surface of the wiring protective layer 36s that is closer to the region where the electrolyte is expected to be filled than the region S1 which is expected to be connected to the resin sealing part 14a, by the method similar to that used for forming the protective resin layer 17 in the first embodiment.

Other processes in the preparation process are similar to those of the first embodiment.

Then, in the sealing process, the working electrode 11 and the counter electrode 12 are overlapped and sealed so that the resin sealing part 14a and the wiring part 30s overlap. The sealing method may be performed in the same manner as the sealing process in the first embodiment.

Then, the terminal 7 is formed on the surface of the counter electrode 12 on the side opposite that facing the working electrode 11, that is, on the metal plate 4 in the first electrode 10 (terminal formation process). The terminal 7 is formed at a position overlapping the current collecting wiring 35c in the region surrounded by the outer circumference of the sealing part 14, when the counter electrode 12 is viewed from the direction perpendicular to the surface of the counter electrode 12.

When the terminal 7 is constituted by a high-melting solder, first, the high-melting solder and a soldering iron tip are disposed so as to be in contact at the position overlapping the current collecting wiring 35c, when the counter electrode 12 is viewed from the direction perpendicular to the surface of the counter electrode 12, on the surface of the counter electrode 12 on the side opposite that facing the working electrode 11

At this time, the soldering iron tip heats the high-melting solder so that the solder can be melted and also generates ultrasound waves. Thus, the high-melting solder is melted by the heat transmitted from the soldering iron tip and also vibrated by the ultrasound waves from the soldering iron tip. Therefore, wettability of the high-melting solder with respect to the metal plate 4 is improved and the solder is fixed to the surface of the metal plate. The terminal 7 is thus formed on the surface of the counter electrode 12. Part of the heat conducted to the region surrounded by the inner circumference of the sealing part 14 via the counter electrode 12 is dissipated to the outside of the outer circumference of the sealing part 14 via the current collecting wiring 35c.

The temperature of the soldering iron tip is not particularly limited, provided that the high-melting solder can be melted. For example, from the standpoint of sufficiently melting the solder, the temperature of 200 to 450° C. is preferred, and from the standpoint of preventing the solder from oxidation and preventing the photosensitizing dye from heat-induced degradation, the temperature of 250 to 350° C. is preferred. The oscillation frequency of ultrasound waves generated from the soldering iron tip is preferably 10 kHz to 200 kHz, and from the standpoint of preventing the metal plate 4 from damage, the frequency of 20 kHz to 100 kHz is preferred.

The soldering iron is then separated from the molten high-melting solder, and the terminal 7 is formed by cooling the high-melting solder.

When the terminal 7 is constituted by a metal member including at least one of copper and nickel, first, the metal member is disposed at a position overlapping the current collecting wiring 35c, when the counter electrode 12 is viewed from the direction perpendicular to the surface of the counter electrode 12, on the surface of the counter electrode 12 on the side opposite that facing the working electrode 11 and a pressure is applied to the metal member so as to press the metal member against the counter electrode 12. This pressure application includes the case in which the pressure is applied to the metal plate by the weight of the metal member itself. In a state in which the pressure is applied to the metal member, ultrasound oscillations are applied to the metal member. As a result, the counter electrode 12 and the metal member are rubbed against each other by the ultrasound oscillations between the counter electrode 12 and the metal member, at least a portion of the unnecessary oxide film is removed, and the counter electrode and the metal member are joined together in a solid phase state by plastic deformation induced by pressure application. The terminal 7 is thus joined to and formed on the surface of the counter electrode 12.

At this time, from the standpoint of bringing the counter electrode 12 into intimate contact with the metal member, it is preferred that the pressure between the counter electrode 12 and the metal member be greater than 0 N/m$^2$ and equal to or less than 300 N/m$^2$, and from the standpoint of preventing the counter electrode 12 from deformation, a pressure of 1 to 100 N/m$^2$ is more preferred.

The ultrasound waves applied to the metal member are preferably applied in the direction parallel to the joining surface of the counter electrode 12 and the metal member. From the standpoint of effectively joining together the counter electrode 12 and the metal member, it is preferred that the oscillation frequency of ultrasound waves be 1 kHz to 200 kHz, and from the standpoint of preventing the counter electrode 12 from damage, the frequency of 10 kHz to 100 kHz is more preferred. From the standpoint of joining, it is preferred that the oscillation amplitude of ultrasound waves be 0.01 to 50 µm, and from the standpoint of preventing the metal member and the metal plate 4 from damage the oscillation amplitude of 0.1 to 10 µm is more preferred.

When the metal member is joined, it is preferred that the metal member be heated because a stronger joint can be obtained. From the standpoint of joining together the counter electrode 12 and the metal member easily, it is preferred that the temperature of the metal member during joining be, for example, 10 to 500° C., and from the standpoint of maintaining good states of the dye and electrolytic solution, the temperature of 20 to 200° C. is even more preferred. At this time, part of the heat conducted to the region surrounded by the inner circumference of the sealing part 14 via the counter electrode 12 is dissipated to the outside of the outer circumference of the sealing part 14 via the current collecting wiring 35c.

The present invention is described above on the basis of the first and second embodiments thereof, but the present invention is not limited to these embodiments.

For example, in the first embodiment, the inorganic sealing part 14b is provided so as to surround the porous oxide semiconductor layer 3, but the present invention is not limited to such a configuration and the inorganic sealing part 14b may be provided only in a portion of the sealing part 14 in the circumferential direction. In this case, in a portion where the inorganic sealing part 14b is not provided, the resin sealing part 14a connects the working electrode 11 to the counter electrode 12.

For example, in the first and second embodiments, the inorganic sealing part 14b is provided only on the working electrode 11, but the present invention is not limited to such a configuration. For example, the inorganic sealing part may be provided on the working electrode 11 and on the counter electrode 12, and the inorganic sealing part provided on the working electrode 11 may be connected to the inorganic sealing part provided on the counter electrode 12 by the resin sealing part. The configuration of the inorganic sealing part provided on the working electrode 11 and the configuration of the inorganic sealing part provided on the counter electrode 12 in this case may be similar to the configuration of the inorganic sealing part 14b in the first and second embodiments. Further, the region on the surface of the inorganic sealing part provided on the working electrode 11 and the inorganic sealing part provided on the counter electrode 12 that is closer to the electrolyte than the region in which the inorganic sealing parts are connected to the resin sealing part may be covered with a protective resin layer.

For example, in the second embodiment, the terminal formation process is performed after the sealing process, but the present invention is not limited to such a configuration. For example, the terminal formation process may be performed before the sealing process.

In this case, the terminal 7 is formed on one surface of the counter electrode 12 prior to sealing. The formation of the terminal 7 may be performed similarly to the terminal formation process in the above-described embodiments.

Then, in order that the terminal 7 is not sealed by the resin sealing part, the working electrode 11 and the counter electrode 12 may be disposed to face each other so that the surface of the counter electrode 12 on the side where the terminal 7 has not been formed faces the working electrode 11 side and then sealing may be performed. The sealing method may be similar to that of the sealing process in the above-described embodiments.

Where the terminal formation process is thus performed before the sealing process, even when heat is applied in the terminal formation process, since this process is performed before the porous oxide semiconductor layer 3 and the electrolyte 5 are sealed, it is possible to prevent the heat of the terminal formation process from being transferred to the photosensitizing dye and the electrolyte 5 and degrading the photosensitizing dye and the electrolyte 5.

Figure 3:
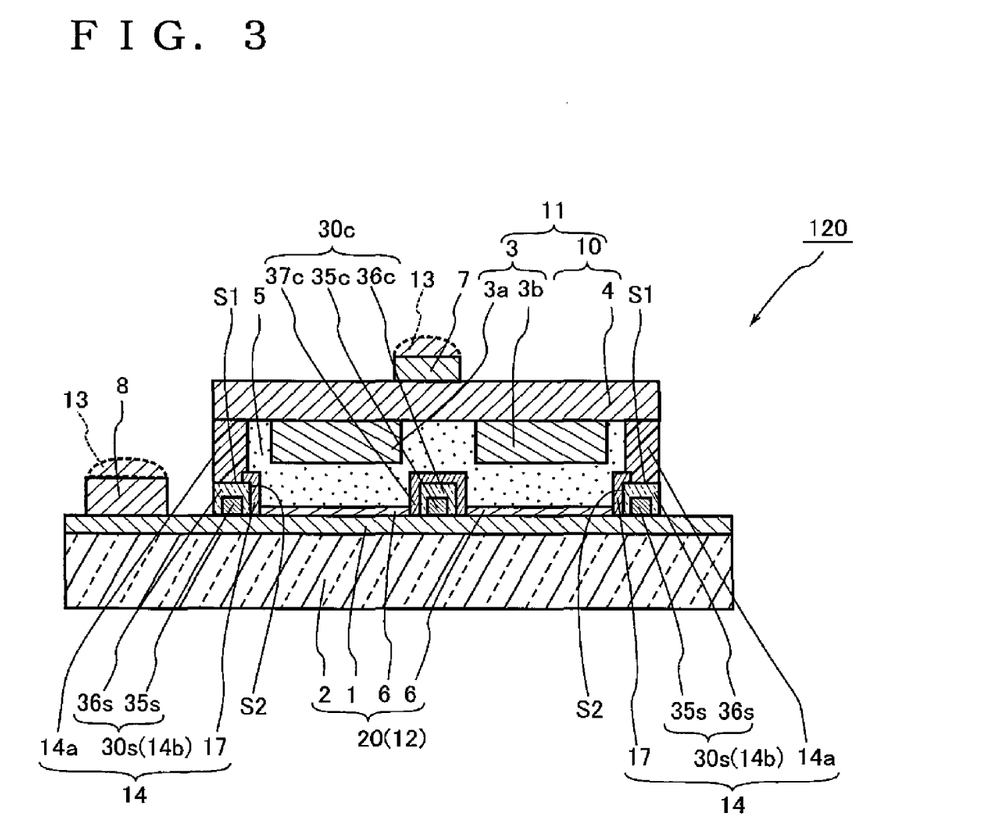
FIG. 3 is a cross-sectional view illustrating a variation example of the photoelectric conversion element shown in FIG. 2.

Further, in the first and second embodiments, the porous oxide semiconductor layer 3 is formed on the second electrode 20. The working electrode 11 is constituted by the second electrode 20 and the porous oxide semiconductor layer 3 supporting the photosensitizing dye, and the counter electrode 12 is constituted by the first electrode 10. However, the present invention is not limited to such a configuration, and a configuration may be used in which the porous oxide semiconductor layer 3 is formed on the first electrode 10, the working electrode 11 is constituted by the first electrode 10 and the porous oxide semiconductor layer 3 supporting the photosensitizing dye, and the counter electrode 12 is constituted by the second electrode 20. FIG. 3 is a cross-sectional view illustrating such a variation example of the photoelectric conversion element 110 shown in FIG. 2. In a photoelectric conversion element 120, the first electrode 10 is constituted by the metal plate 4, and the working electrode 11 is constituted by the first electrode 10 and the porous oxide semiconductor layer 3 supporting the photosensitizing dye. Further, the second electrode 20 is constituted by the transparent base material 2, transparent conductor 1, and the catalyst layer 6 provided on the transparent conductor 1, and the counter electrode 12 is constituted by the second electrode 20. The catalyst layer 6 is constituted, for example, by platinum or the like that is formed as a film thin enough to transmit light.

The photoelectric conversion element 120 is manufactured in the following manner. First, the first electrode 10 constituted by the metal plate 4 is prepared. Then, the porous oxide semiconductor layer 3 is formed on the first electrode 10. The method for forming the porous oxide semiconductor layer 3 may be performed by the process similar to that for forming the porous oxide semiconductor layer 3 in the second embodiment. The photosensitizing dye is then supported on the porous oxide semiconductor layer 3. The photosensitizing dye may be supported by a method similar to that used for supporting the photosensitizing dye in the above-described embodiments. The working electrode 11 is thus obtained in which the porous oxide semiconductor layer 3 is formed on the first electrode 10.

The counter electrode 12 is then prepared. In the preparation of the counter electrode 12, the transparent conductor 1 is formed on the transparent base material 2, and the catalyst layer 6 is formed on the transparent conductor 1 except the region where the wiring parts 30c, 30s are expected to be formed, thereby producing the second electrode. The method for forming the transparent conductor 1 may be performed by the method similar to that for forming the transparent conductor 1 on the transparent base material 2 in the second embodiment. The method for forming the catalyst layer on the transparent conductor 1 may be performed by the method similar to that for forming the catalyst layer on the metal plate 4 in the above-described embodiments. The second electrode thus obtained serves as the counter electrode 12.

The wiring parts 30c, 30s are then formed. The formation of the wiring parts 30c, 30s may be performed by the method similar to that of the second embodiment. The second electrode on which the wiring parts 30c, 30s are formed is thus obtained.

The porous oxide semiconductor layer 3 and the electrolyte 5 are then sealed between the working electrode 11 and the counter electrode 12 by the sealing part 14. The sealing method may be performed by the process similar to the sealing process in the second embodiment. The terminal 7 is then formed. The formation of the terminal 7 may be performed in the same manner as in the terminal formation process in the second embodiment. Other processes are similar to those of the second embodiment.

The photoelectric conversion element 120 is thus obtained.

In the above-described process for manufacturing the photoelectric conversion element 120, the terminal 7 is formed after the sealing process, but the terminal 7 may be formed before the sealing process. By thus forming the terminal, even when heat is applied in the terminal formation process, the heat is not transferred to the electrolyte 5, and the electrolyte 5 can be prevented from being degraded by the heat generated in the terminal formation process.

In the above-described process for manufacturing the photoelectric conversion element 120, the terminal 7 may be formed before the dye support process. By thus forming the terminal, even when heat is applied in the terminal formation process, the heat is not transferred to the photosensitizing dye, and the photosensitizing dye can be prevented from being degraded by the heat generated in the terminal formation process.

In the above-described embodiments, the terminal 7 is formed at the position overlapping the current collecting wiring 35c in the region surrounded by the outer circumference of the sealing part 14, when the counter electrode 12 is viewed along the direction in which the working electrode 11 and the counter electrode 12 are connected, on the surface of the counter electrode 12 on the side opposite that facing the working electrode 11. However, the present invention is not limited to such a configuration, and the terminal may be formed at a position overlapping the current collecting wiring 35s.

Further, in the first and second embodiments, the second electrode is constituted by the transparent base material 2 and the transparent conductor 1 provided on the transparent base material 2, but the second electrode may be also constituted by electrically conductive glass. In this case, a configuration may be used in which the terminal is formed on the surface of the second electrode on the side opposite that facing the first electrode.

Further, in the configuration of the first and second embodiments, the current collecting wiring is formed only on the surface of the working electrode, but for example, it is also possible to use the counter electrode of electrically conductive glass and form the current collecting wiring on the surface of the counter electrode facing the working electrode.

The first electrode is configured by titanium or an alloy including titanium and the catalyst layer, but the first electrode may be also configured by providing the catalyst layer on a metal such as nickel or constituted by a platinum plate or the like. The material constituting the terminal 7 is not particularly limited, as long as it is a conductive material provided on the first electrode.

INDUSTRIAL APPLICABILITY

The present invention provides a photoelectric conversion element excellent in durability.

EXPLANATION OF REFERENCE NUMERALS 1 transparent conductor
2 transparent base material
3, 3a, 3b porous oxide semiconductor layers
5 electrolyte
7 terminal
8 terminal
10 first electrode
11 working electrode
12 counter electrode
14 sealing part
14a resin sealing part
14b inorganic sealing part
17 protective resin layer
20 second electrode
30c, 30s wiring portions
35c, 35s current collecting wirings
36c, 36s wiring protection layers
100, 110, 120 photoelectric conversion elements

The invention claimed is:

1. A photoelectric conversion element comprising:
a pair of electrodes that face one another;
a porous oxide semiconductor layer provided on one of the pair of electrodes;
an electrolyte disposed between the pair of electrodes; and
a sealing part that connects the pair of electrodes, and surrounds and seals the porous oxide semiconductor layer and the electrolyte, wherein
at least a portion of the sealing part is constituted by an inorganic sealing part formed of an inorganic sealing material and formed on a surface of at least one of the pair of electrodes and a resin sealing part that is connected to the inorganic sealing part along a direction of connecting the pair of electrodes and formed of a material including a resin, the inorganic sealing part surrounding the porous oxide semiconductor layer;

the inorganic sealing part comprises a wiring part having
- a current collecting wiring constituted by a metal and provided on at least one surface of the pair of electrodes between the pair of electrodes and
- a wiring protective layer constituted by an inorganic protective material and covering the current collecting wiring;

at least a portion of the wiring part constitutes at least a portion of the inorganic sealing part; and in a portion of the sealing part in which the wiring part constitutes the inorganic sealing part, a region of a surface of the wiring protective layer facing the electrolyte is covered with a protective resin layer that contacts the electrolyte and is resistant to the electrolyte, so that the current collecting wiring is prevented from contact with the electrolyte;

wherein the resin sealing part contacts the electrolyte and is bonded to the wiring protective layer; and wherein the protective resin layer and the resin sealing part are distinct structures.

2. The photoelectric conversion element according to claim 1, wherein other portion of the wiring part is provided on at least one surface of the pair of electrodes in a region surrounded by an inner circumference of the sealing part, and the wiring protective layer in the region surrounded by the inner circumference of the sealing part is entirely covered with the protective resin layer.

3. The photoelectric conversion element according to claim 1, wherein: the wiring part is provided so as to extend from a region surrounded by an outer circumference of the sealing part to an outside of the outer circumference of the sealing part, a terminal is provided on a surface in at least one of the electrodes of the pair of electrodes on an opposite side to the electrolyte, and the terminal is formed at a position overlapping the wiring part in the region surrounded by the outer circumference of the sealing part when the electrode provided with the terminal is viewed along a direction of connecting the pair of electrodes.

4. The photoelectric conversion element according to claim 2, wherein: the wiring part is provided so as to extend from a region surrounded by an outer circumference of the sealing part to an outside of the outer circumference of the sealing part, a terminal is provided on a surface in at least one of the electrodes of the pair of electrodes on an opposite side to the electrolyte, and the terminal is formed at a position overlapping the wiring part in the region surrounded by the outer circumference of the sealing part when the electrode provided with the terminal is viewed along a direction of connecting the pair of electrodes.

5. The photoelectric conversion element according to claim 1, wherein a surface of the protective resin layer facing another of the pair of electrodes contacts the electrolyte.

* * * * *